United States Patent
Irie

(10) Patent No.: US 12,092,538 B2
(45) Date of Patent: Sep. 17, 2024

(54) STRESS ANALYSIS DEVICE FOR MOVING BODY

(71) Applicant: Panasonic Intellectual Property Management Co., Ltd., Osaka (JP)

(72) Inventor: Yousuke Irie, Nara (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 312 days.

(21) Appl. No.: 17/536,991

(22) Filed: Nov. 29, 2021

(65) Prior Publication Data
US 2022/0082460 A1 Mar. 17, 2022

Related U.S. Application Data

(63) Continuation of application No. PCT/JP2020/014275, filed on Mar. 27, 2020.

(30) Foreign Application Priority Data

May 30, 2019 (JP) ................................. 2019-101501

(51) Int. Cl.
G01L 1/24 (2006.01)
G06T 7/246 (2017.01)

(52) U.S. Cl.
CPC .............. *G01L 1/248* (2013.01); *G06T 7/246* (2017.01); *G06T 2207/10048* (2013.01)

(58) Field of Classification Search
CPC .............. G01L 1/248; G06T 7/246; G06T 2207/10048; G01M 17/08
See application file for complete search history.

(56) References Cited

U.S. PATENT DOCUMENTS

| 10,900,844 B2* | 1/2021 | Irie | H04N 5/33 |
| 11,467,046 B2* | 10/2022 | Irie | H01J 37/222 |
| 11,808,657 B2* | 11/2023 | Irie | G01M 5/0091 |

(Continued)

FOREIGN PATENT DOCUMENTS

| CN | 102103748 A | 6/2011 |
| JP | S61-186828 A | 8/1986 |

(Continued)

OTHER PUBLICATIONS

Extended European Search Report dated May 31, 2022 issued in the corresponding European Patent Application No. 20814855.1.

(Continued)

*Primary Examiner* — An H Do
(74) *Attorney, Agent, or Firm* — Rimon P.C.

(57) ABSTRACT

A stress analysis device for moving body, includes: an infrared camera that captures an infrared image of a moving body while making a relative movement with respect to the moving body; and an image processing unit that performs image processing on a plurality of the infrared images captured by the infrared camera. The image processing unit includes: an alignment unit that aligns portions of an object included in the moving body in the plurality of the infrared images including the object, and a stress distribution calculation unit that calculates temperature changes of each of the portions of the object to obtain stress distributions of the portions of the object based on the temperature changes.

14 Claims, 13 Drawing Sheets

(56) References Cited

U.S. PATENT DOCUMENTS

2005/0143938 A1    6/2005  Schulze et al.
2018/0348064 A1  12/2018  Irie et al.

FOREIGN PATENT DOCUMENTS

| JP | 5453951 B2 | 3/2014 |
| JP | 2017-138276 A | 8/2017 |
| WO | 2017/141294 A1 | 8/2017 |

OTHER PUBLICATIONS

International Search Report issued in corresponding International Application No. PCT/JP2020/014275, dated Apr. 21, 2020 w/English Translation.
English translation of International Preliminary Report on Patentability issued in International Patent Application No. PCT/JP2020/014275, dated Dec. 9, 2021.
Chinese Office Action dated May 26, 2023 issued in the corresponding Chinese Patent Application No. 202080037653.0, with English machine translation of Office Action and Search Report.
European Office Action dated Jun. 14, 2024 issued in the corresponding European Patent Application No. 20814855.1.

\* cited by examiner

STRESS ANALYSIS DEVICE FOR MOVING BODY

CROSS-REFERENCE TO RELATED APPLICATIONS

This application is a continuation under 35 U.S.C. § 111(a) of International Patent Application No. PCT/JP2020/014275, filed on Mar. 27, 2020, which in turn claims priority to Japanese Patent Application No. 2019-101501 filed on May 30, 2019, the contents of each of which are incorporated herein by reference in their entirety.

BACKGROUND

1. Technical Field

The present invention relates to a stress analysis device for a moving body using an infrared image.

2. Description of the Related Art

The inventor of the present invention has already proposed a technique for measuring a distribution of stress generated in a fixed structure such as a bridge on a highway using an infrared image (see, for example, WO 2017/141294 A).

SUMMARY

However, as for a moving body such as an electric train, although a stress at some places is obtained by using a sensor such as a stress sensor, a stress distribution is not obtained for all wheels or the like of the running electric train.

The present disclosure was conceived in view of the situations and it is therefore one non-limiting and exemplary embodiment provides a stress analysis device capable of measuring a stress distribution of a moving body such as a traveling electric train.

In one general aspect, the techniques disclosed here feature: a stress analysis device for moving body according to a first aspect includes:
- an infrared camera that captures an infrared image of a moving body while making a relative movement with respect to the moving body; and
- an image processing unit that performs image processing on a plurality of the infrared images captured by the infrared camera, the image processing unit including:
  - an alignment unit that aligns portions of an object included in the moving body in the plurality of the infrared images including the object, and
  - a stress distribution calculation unit that calculates temperature changes of each of the portions of the object to obtain stress distributions of the portions of the object based on the temperature changes.

According to the stress analysis device for moving body, a stress distribution of a moving body such as a running electric train can be measured.

Additional benefits and advantages of the disclosed embodiments will be apparent from the specification and figures. The benefits and/or advantages may be individually provided by the various embodiments and features of the specification and drawings disclosure, and need not all be provided in order to obtain one or more of the same.

BRIEF DESCRIPTION OF DRAWINGS

The present disclosure will become readily understood from the following description of non-limiting and exemplary embodiments thereof made with reference to the accompanying drawings, in which like parts are designated by like reference numeral and in which.

DETAILED DESCRIPTION

Figure 1:
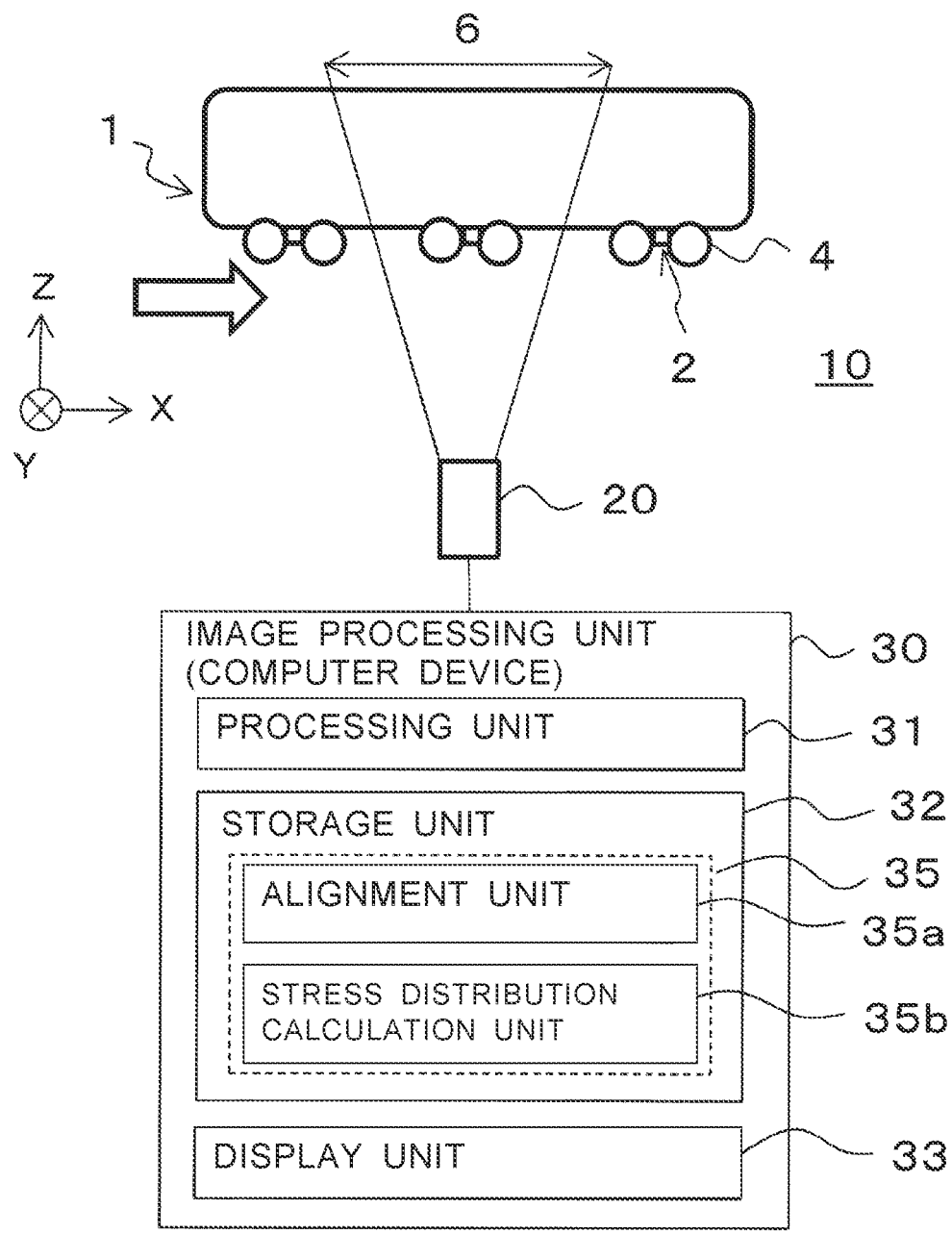
FIG. 1 is a schematic diagram illustrating a configuration of a stress analysis device for a moving body according to a first embodiment.

A stress analysis device for moving body according to a first aspect includes:
- an infrared camera that captures an infrared image of a moving body while making a relative movement with respect to the moving body; and
- an image processing unit that performs image processing on a plurality of the infrared images captured by the infrared camera, the image processing unit including:
  - an alignment unit that aligns portions of an object included in the moving body in the plurality of the infrared images including the object, and
  - a stress distribution calculation unit that calculates temperature changes of each of the portions of the object to obtain stress distributions of the portions of the object based on the temperature changes.

In a stress analysis device for moving body according to a second aspect, in the first aspect, the alignment unit may divide one infrared image into a plurality of frames each having a rectangular shape in a direction perpendicular to a direction of the relative movement, and the alignment unit may align the portions on the plurality of frames in the plurality of the infrared images through pattern matching of preset feature portions of the portions of the object included in the moving body, and the alignment unit may specify frames common to the plurality of frames in the plurality of the infrared images.

In a stress analysis device for moving body according to a third aspect, in the second aspect, the stress distribution calculation unit may obtain stress distributions of the portions of the object based on the temperature changes in each of the portions calculated as differences between the plurality of frames over a continuous time interval including the frames common in the plurality of the infrared images.

In a stress analysis device for moving body according to a fourth aspect, in the third aspect, the stress distribution calculation unit may obtain stress distributions based on temperature differences between a highest temperature and a lowest temperature of each of the portions in the plurality of frames over the continuous time interval.

In a stress analysis device for moving body according to a fifth aspect, in any one of the first to fourth aspects, the infrared camera may be fixed.

Hereinafter, a stress analysis device for moving body and a stress analysis method according to an embodiment will be described with reference to the accompanying drawings. In the drawings, substantially identical members are denoted by identical reference numerals.

First Embodiment

<Stress Analysis Device for Moving Body>

FIG. 1 is a schematic diagram illustrating a configuration of a stress analysis device 10 for a moving body according to a first embodiment. Note that for convenience, a traveling direction of a moving body 1 is indicated as an x direction, and a vertical direction is indicated as a z direction.

The stress analysis device 10 for moving body according to the first embodiment includes an infrared camera 20 that captures an infrared image of the moving body 1, and an image processing unit 30 that performs image processing on a plurality of infrared images captured by the infrared camera 20. Infrared camera 20 captures an infrared image of the moving body 1 while making a relative movement with respect to the moving body 1. The image processing unit 30 includes an alignment unit 35a and a stress distribution calculation unit 35b. The alignment unit 35a aligns portions of an object in infrared images including the object included in the moving body 1. The stress distribution calculation unit calculates temperature changes in each of the portions of the object, and obtains stress distributions of the portions of the object based on the temperature changes. Although FIG. 1 illustrates an example of a vehicle (electric train) as the moving body 1, the moving body 1 is not limited to this, and may be a vehicle, a crane, or the like. A moving direction of the moving body is not limited to a horizontal direction, and may be a vertical direction.

According to this stress analysis device, a stress distribution of the moving body such as a running electric train can be measured.

Hereinafter, components making up the stress analysis device for moving body will be described.

<Infrared Camera>

The infrared camera 20 has a plurality of pixels, for example, 320×256 pixels, and captures an infrared image of the moving body 1 over a predetermined field of view 6 while making a relative movement with respect to the moving body 1. Image capturing is performed at a predetermined frame rate, for example, 100 Hz to 3000 Hz (100 frames/second to 3000 frames/second). Note that the characteristics of the infrared camera are merely examples, and are not limited thereto.

Note that at least one infrared camera 20 may be installed. Two or more infrared cameras may be used to gain the number of frames, but in this case, desirably alignment is performed on infrared images captured by the respective infrared cameras.

In addition, the plurality of infrared cameras 20 may be used to simultaneously capture infrared images of the moving body 1 such as an electric train from a plurality of different fields of view.

Further, the infrared camera 20 only needs to make the relative movement with respective to the moving body 1. Therefore, the infrared camera 20 may be fixed. Alternatively, the infrared camera 20 may be moved in the same direction as the traveling direction of the electric train. This makes it possible to increase the number of infrared images of the same portion of the electric train.

Figure 2A:
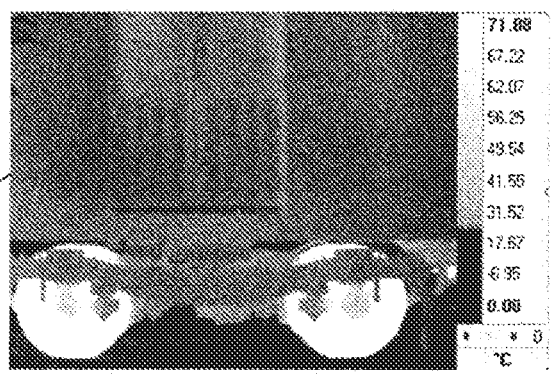
FIG. 2A is an infrared image of an electric train at time t1.
Figure 2B:
FIG. 2B is an infrared image of the electric train at time t2.
Figure 2C:
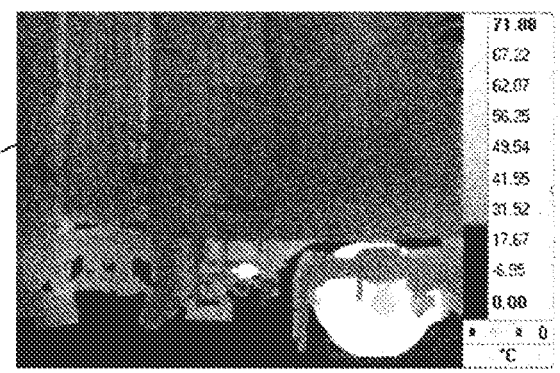
FIG. 2C is an infrared image of the electric train at time t3.

FIG. 2A is an infrared image 12a of the electric train 1 at time t1. FIG. 2B is an infrared image 12b of the electric train 1 at time t2. FIG. 2C is an infrared image 12c of the electric train 1 at time t3.

As illustrated in FIGS. 2A to 2C, the infrared images 12a to 12c corresponding to the field of view 6 of the infrared camera 20 change with the traveling of the electric train 1 as time t1, time t2, and time t3 pass. Specifically, at time t1 in FIG. 2A, the entire car including the two driving wheels is imaged in the infrared image 12a. At the next time t2 in FIG. 2B, the front driving wheel is out of the infrared image 12b, and the rear driving wheel is imaged at the center of the infrared image 12b. At the next time t3 in FIG. 2C, the rear driving wheel is imaged at the front end of the infrared image 12c. The infrared camera 20 may be installed a distance away from the moving body 1. As a result, many portions of the moving body 1 can be included in the field of view 6. Alternatively, the infrared camera 20 may be installed close to the moving body 1. This can increase the resolution.

In these infrared images, the level of the temperature is represented by, for example, 16 shades of gray. The closer to white, the higher the temperature is, and the closer to black, the lower the temperature. Note that in the infrared image, unlike a visible image, a distinction is difficult only by the difference in shape, and the larger the temperature difference is, the easier the distinction of shades.

<Image Processing Unit (Computer Device)>

The image processing unit 30 performs image processing on a plurality of infrared images. The image processing unit 30 is, for example, a computer device. As the computer device, a general-purpose computer device can be used. Such a computer device includes, for example, as illustrated in FIG. 1, a processing unit 31, a storage unit 32, and a display unit 33. Note that the computer device may further include an input device, a storage device, an interface, and the like.

<Processing Unit>

The processing unit 31 may be, for example, a central processing operator [central processing unit (CPU), microprocessor unit (MPU)], etc.), a microcomputer, or a processing device capable of executing a computer-executable command.

<Storage Unit>

The storage unit 32 may be, for example, at least one of a read only memory (ROM), an electrically erasable/programmable read only memory (EEPROM), a random access memory (RAM), a flash solid-state disc (SSD), a hard disk, a universal serial bus (USB) memory, a magnetic disk, an optical disk, a magneto-optical disk, and the like.

The storage unit 32 includes a program 35. Note that in a case where the image processing unit 30 is connected to a network, the program 35 may be downloaded from the network as necessary.

<Program>

The program 35 includes an alignment unit 35a and a stress distribution calculation unit 35b. At the time of execution, the alignment unit 35a and the stress distribution calculation unit 35b are read from the storage unit 32 and executed by the processing unit 31.

<Alignment Unit>

The alignment unit 35a aligns the portions of the object in the infrared images 12a to 12c including the object included in the moving body. Specifically, as illustrated in FIGS. 3A, 4A, 5A, 6A, and 7A, the infrared image 12a is divided into a plurality of rectangular frames 14a to 14e in a direction perpendicular to the direction of the relative movement. The division into the frames 14a to 14e may be defined in advance in the program. Alternatively, the frames may be cut out by the program. Each frame may have the minimum number of pixels from which a feature amount can be extracted.

Further, for the frames 14a to 14e, alignment (position correction) is performed on the respective portions (car 2, wheels 4, etc.) of the moving body, that is, the object included in the electric train. The alignment is performed by pattern matching for the portions, that is, preset feature portions such as the car 2, the wheels 4, etc. in FIG. 1 in the plurality of infrared images 12a to 12c. For example, since the rotating wheel 4 and the like has a comparatively high temperature, a shape including a boundary between the wheel 4 and the car 2 can be detected as the feature portion. Note that since the contour of the rotating wheel itself needs to be aligned taking the number of revolutions and the like into consideration, precise alignment is not necessarily required. Note that the pattern matching itself may be performed by using a method usually used for a shape based on a numerical value of the 16 shades of gray in each pixel.

Further, as for the above frames, common frames in the plurality of infrared images 12a to 12c are specified. That is, when the respective portions of the plurality of infrared images 12a to 12c are aligned, for example, regarding the frame 14a of one infrared image 12a, the corresponding frames can be specified in the other infrared images 12b and 12c.

<Stress Distribution Calculation Unit>

The stress distribution calculation unit 35b calculates a temperature change in each portion of the object to obtain a stress distribution in each portion of the object based on the temperature change. Specifically, the stress distribution calculation unit 35b first plots a temperature obtained from the infrared image versus time, and calculates a change amount of stress over time as the stress change amount for each pixel of each portion based on the temperature change amount of each portion over a continuous time interval.

Further, the stress distribution calculation unit 35b specifies a continuous time interval including the frames 14a to 14e common in the plurality of infrared images 12a to 12c. This corresponds to selecting common frames 14a to 14e from the plurality of infrared images in which a specific portion of the object, such as one car including two wheels 4 in a side view, is imaged over the continuous time interval. In other words, one frame is in the field of view of the infrared camera over the continuous time interval. As the electric train travels, the frame is out of the field of view and cannot be seen.

In addition, for example, as to one frame 14a, a stress distribution 16a (FIG. 3C) in a portion of the object, for example, the periphery of the wheel 4 is obtained. The stress distribution is based on a temperature change $\Delta T$ in the portion calculated as a difference between the common frames over the continuous time interval. Similarly, as to the frames 14b to 14e, stress distributions 16b to 16e (FIGS. 4C, 5C, 6C, and 7C) in the portions of the object is obtained. Each of the stress distribution is based on the temperature change $\Delta T$ in each of the portions calculated as the difference between the common frames over the continuous time interval. In the stress distribution, a larger change in stress is displayed with white, and a smaller change in stress is displayed with black.

As a result, when the moving body is an electric train or the like, a stress distribution in the car or the like can be obtained. Thus, this distribution is useful for detecting a defect such as a crack.

Note that the stress distribution calculation unit 35b calculates the stress change amount $\Delta\delta$ from the temperature change amount $\Delta T$ using, for example, the following equation (1) expressing a thermoelastic effect.

$$\Delta T = -KT\Delta\delta \qquad (1)$$

In the expression, a thermoelastic coefficient K is expressed as $K=\alpha/(CP)$, and T represents an absolute temperature of the surface of the electric train that is the moving body. Symbol a represents a linear expansion coefficient of the surface of the electric train, symbol ρ represents a density of the surface of the electric train, and symbol CP represents specific heat of the surface of the electric train under constant stress.

Then, the stress distribution calculation unit 35b can obtain the stress distribution of each portion based on the stress change amounts of all the pixels.

Note that, in a case where the frame rate is 100 Hz, the time interval between the frames is 0.01 seconds, and in a case where the frame rate is 2500 Hz, the time interval between the frames is only 0.0004 seconds. In some cases, a sufficient temperature change cannot occur between several frames. Therefore, in the case of the electric train, imaging is performed at a timing when a great stress is instantaneously applied. That is, a temperature change that occurs due to a comparatively great stress is imaged. For example, a small step may be provided on a rail so that imaging may be performed when the electric train passes through the step or through a joint of the rail. Alternatively, imaging may be performed at the moment when braking is applied or at the timing when the center of gravity of the car changes at starting.

Furthermore, the stress distribution calculation unit 35b can obtain, for example, stress distributions 16a to 16e illustrated in FIGS. 3C, 4C, 5C, 6C, and 7C corresponding to the frames 14a to 14e in the continuous time interval. The stress change value $\Delta\delta$ of each portion is calculated based on, for example, a temperature difference between the highest temperature and the lowest temperature of each portion.

Figure 9:
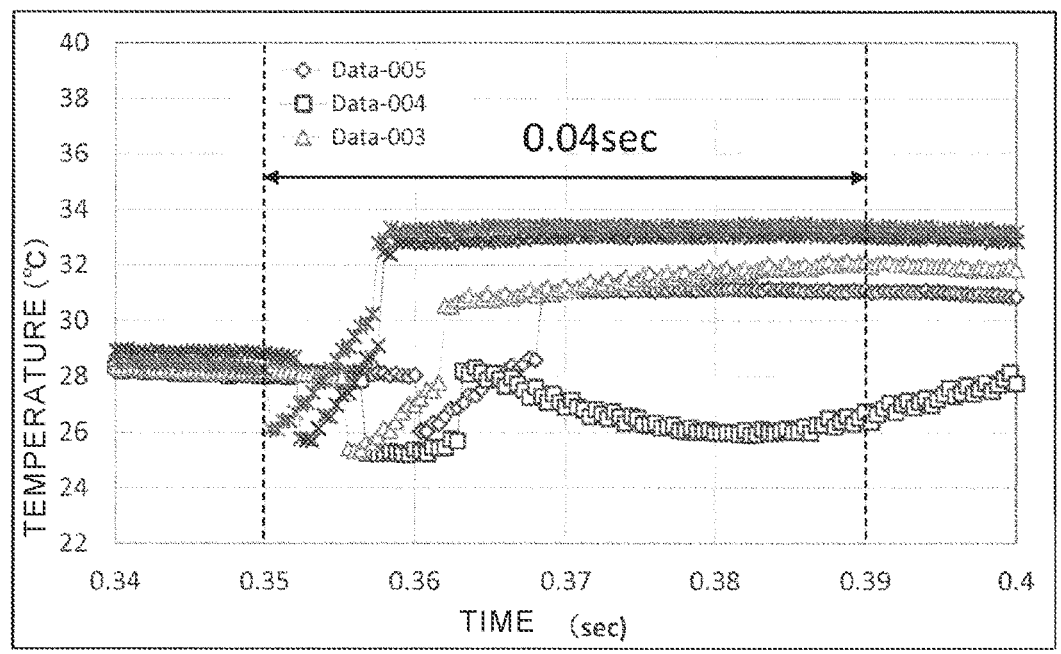
FIG. 9 is a graph on which the graphs of FIGS. 8A to 8E are superimposed.
Figure 10:
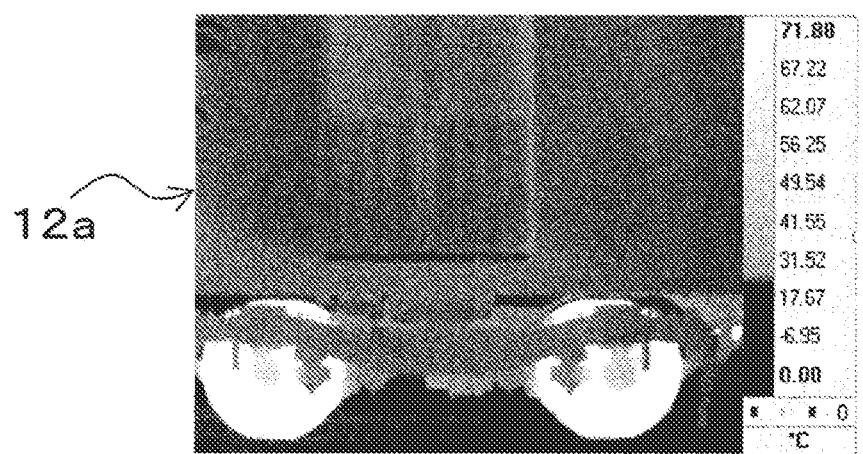
FIG. 10 is an infrared image including the car of the electric train that is an object.
Figure 11:
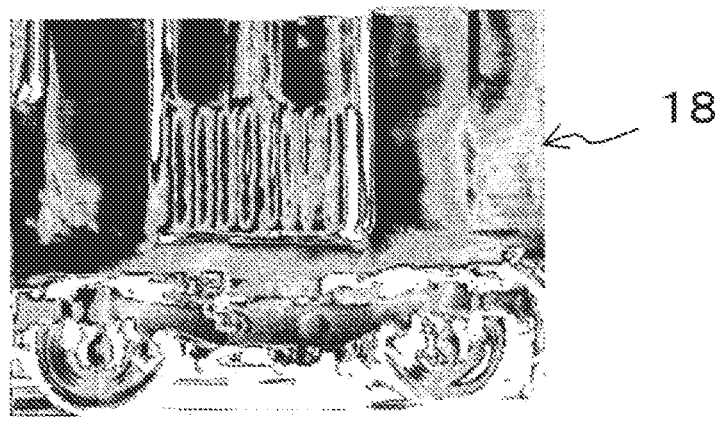
FIG. 11 is a stress distribution image of a portion including the car of the electric train that is the object of FIG. 10.

FIG. 9 is a graph on which the graphs of FIGS. 8A to 8E are superimposed. FIG. 10 is an infrared image including the car of the electric train that is the object. FIG. 11 is a stress distribution image of the portion including the car of the electric train that is the object of FIG. 10.

The stress distribution calculation unit 35b can obtain the stress distribution of the entire car including the two driving wheels included in one infrared image of FIG. 10. Specifically, as illustrated in FIG. 9, the temperature change in each of the frames 14a to 14e obtains a stress distribution for 0.04 seconds in which the entire car is included in one infrared image. In this case, as illustrated in FIG. 11, a stress distribution image 18 can be obtained. This image is obtained by combining the stress distributions 16a to 16e corresponding to the plurality of rectangular frames 14a to 14e divided in the direction perpendicular to the direction of the relative movement. As compared with the case of the stress distributions 16a to 16e corresponding to the individual frames 14a to 14e, the overall stress distribution image 18 enables observation of the relationship of the overall stress distribution and thus can be helpful in detecting a distortion or the like.

<Display Unit>

The display unit 33 may display the captured infrared images, the graphs of temperature changes, the obtained stress distributions, the stress distribution image (FIG. 11), and the like.

<Stress Analysis Method>

Figure 12:
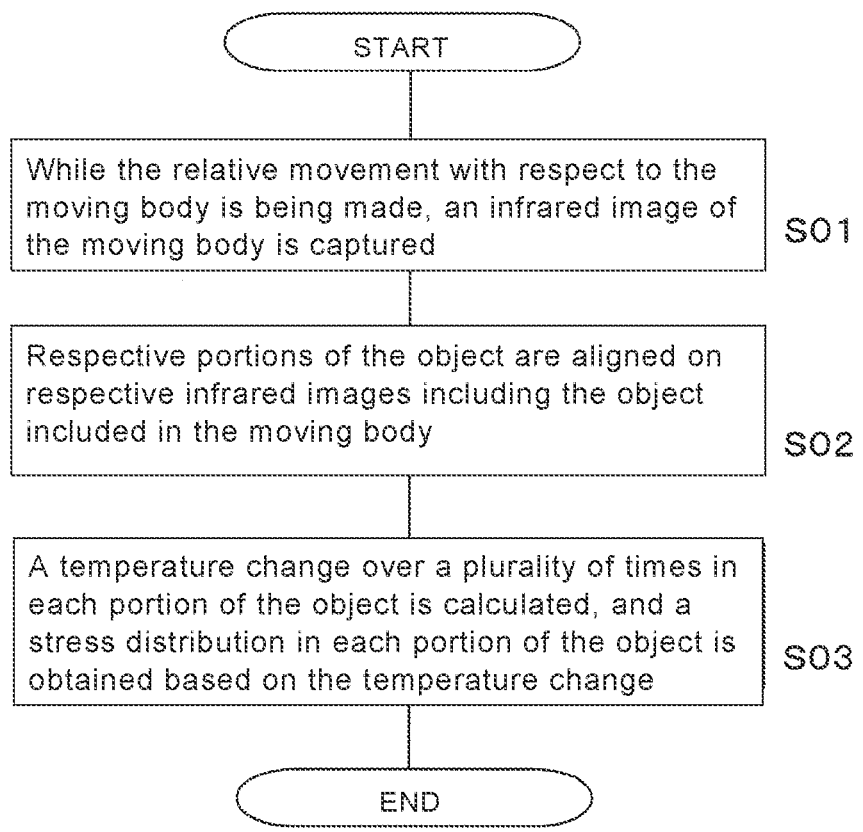
FIG. 12 is a flowchart of a stress analysis method for a moving body according to the first embodiment.

FIG. 12 is a flowchart of a stress analysis method for the moving body according to the first embodiment.

(1) While the relative movement with respect to the moving body such as the electric train 1 is being made, an infrared image of the electric train 1 as the moving body is captured (S01).
(2) Respective portions of the object are aligned on respective infrared images including the object included in the moving body (S02).
(3) A temperature change over a plurality of times in each portion of the object is calculated, and a stress distribution in each portion of the object is obtained based on the temperature change (S03).

As described above, the distribution of the stress applied to the moving body can be obtained. As a result, in the case where the moving body is the electric train or the like, a stress distribution in the car or the like can be obtained. The stress distribution is useful for detecting a defect such as a crack, detecting an abnormality by periodically obtaining and comparing stress distributions, or performing design verification as verification data of dynamic analysis such as simulation.

EXAMPLES

Figure 3A:
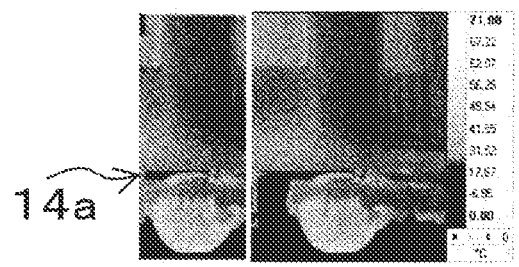
FIG. 3A is a diagram obtained by cutting out a frame of a portion around a rear wheel of a car of the electric train from an infrared image that has been subject to position correction.
Figure 3B:
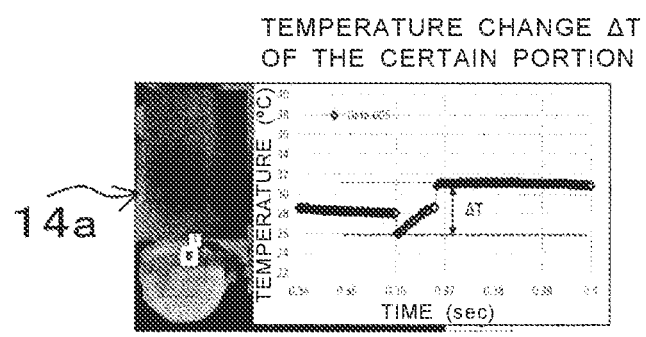
FIG. 3B is a graph showing a temperature change at a specific location in the frame of FIG. 3A.
Figure 3C:
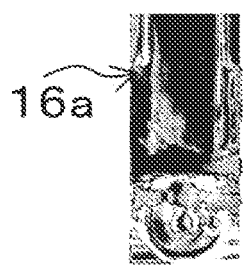
FIG. 3C is a stress distribution based on a temperature difference in a predetermined time range of FIG. 3B.
Figure 4A:
FIG. 4A is a diagram obtained by cutting out a frame of a portion around a rear side between front and rear wheels of the car of the electric train from an infrared image that has been subject to position correction.
Figure 4B:
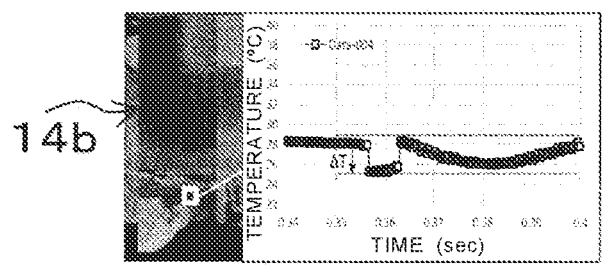
FIG. 4B is a graph showing a temperature change at a specific location in the frame of FIG. 4A.
Figure 4C:
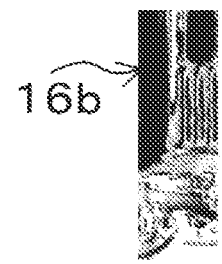
FIG. 4C is a stress distribution based on a temperature difference in a predetermined time range of FIG. 4B.
Figure 5A:
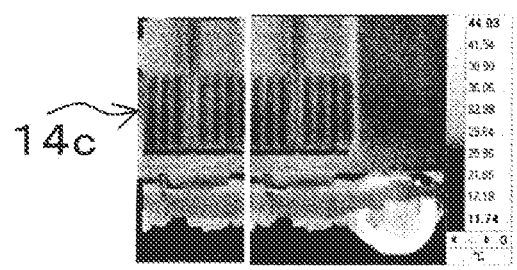
FIG. 5A is a diagram obtained by cutting out a frame of a portion around a central side between the front and rear wheels of the car of the electric train from an infrared image that has been subject to position correction.
Figure 5B:
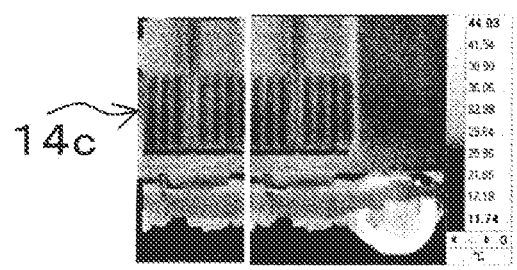
FIG. 5B is a graph showing a temperature change at a specific location in the frame of FIG. 5A.
Figure 5C:
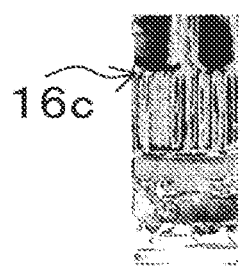
FIG. 5C is a stress distribution based on a temperature difference in a predetermined time range of FIG. 5B.
Figure 6A:
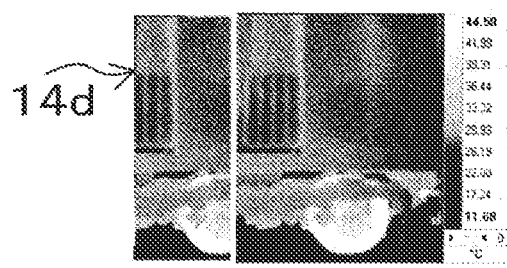
FIG. 6A is an image obtained by cutting out a frame of a portion around a front side between the front and rear wheels of the car of the electric train from an infrared image that has been subject to position correction.
Figure 6B:
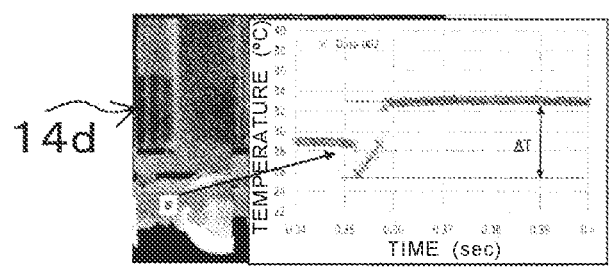
FIG. 6B is a graph showing a temperature change at a specific location in the frame of FIG. 6A.
Figure 6C:
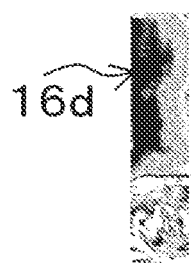
FIG. 6C is a stress distribution based on a temperature difference in a predetermined time range of FIG. 6B.
Figure 7A:
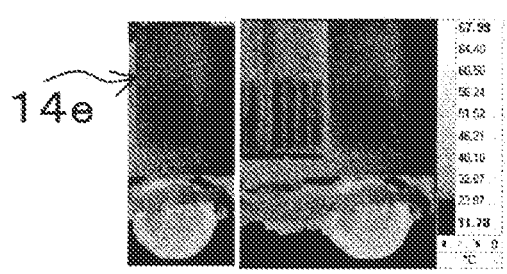
FIG. 7A is a diagram obtained by cutting out a frame of a portion around a front wheel of the car of the electric train from an infrared image that has been subject to position correction.
Figure 7B:
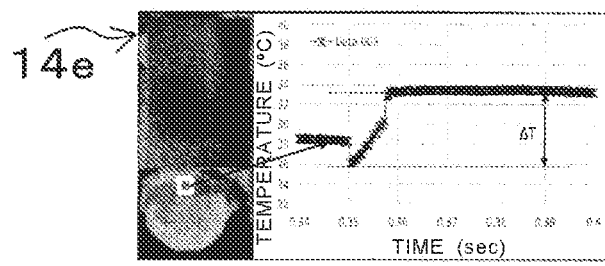
FIG. 7B is a graph showing a temperature change at a specific location in the frame of FIG. 7A.
Figure 7C:
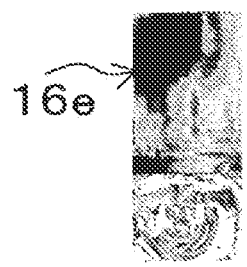
FIG. 7C is a stress distribution based on a temperature difference in a predetermined time range of FIG. 7B.
Figure 8A:
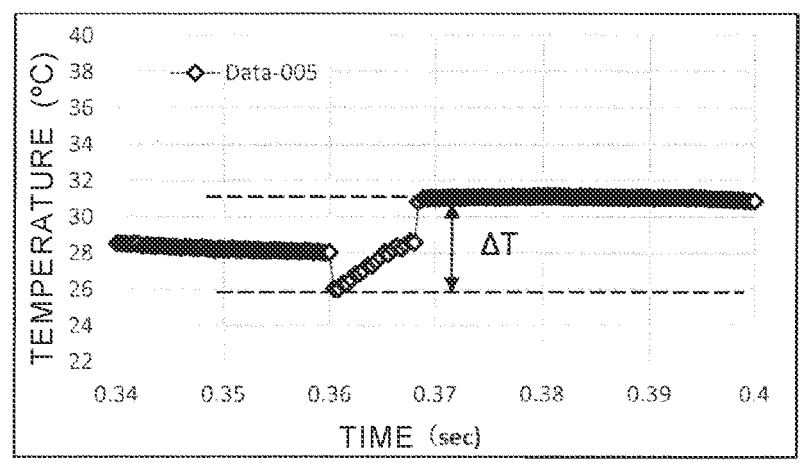
FIG. 8A is a graph showing a temperature change at a specific location in a portion around a rear wheel of the car of the electric train after position correction.
Figure 8B:
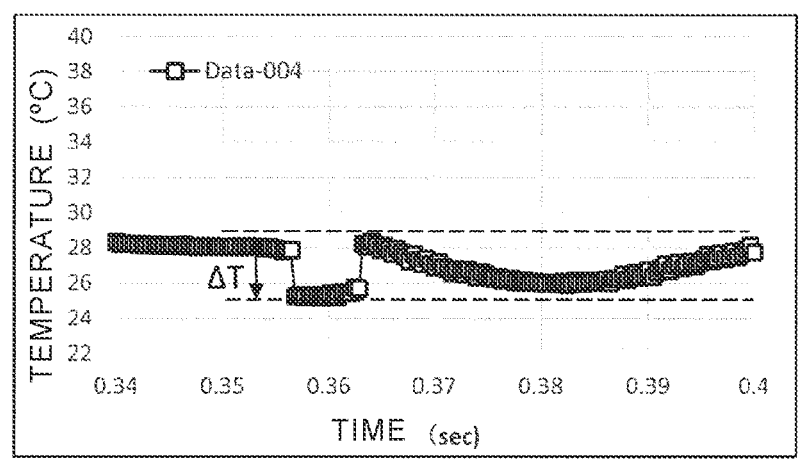
FIG. 8B is a graph showing a temperature change at a specific location in a portion around a rear side between the front and rear wheels of the car of the electric train.
Figure 8C:
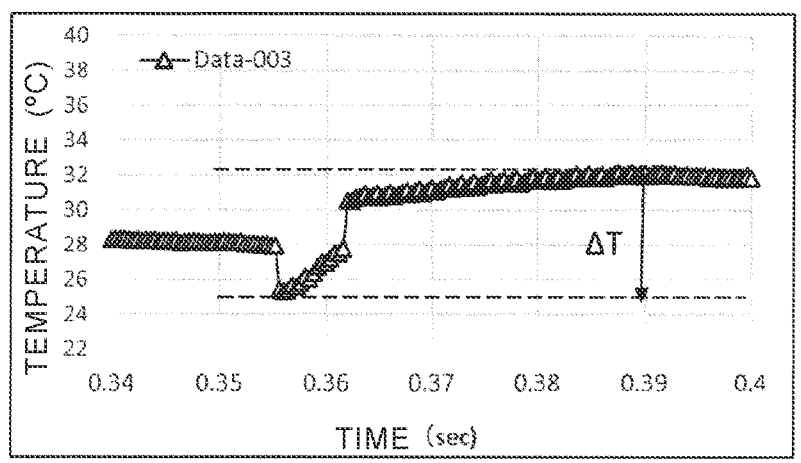
FIG. 8C is a graph showing a temperature change at a specific location in a portion around a central side between the front and rear wheels of the car of the electric train.
Figure 8D:
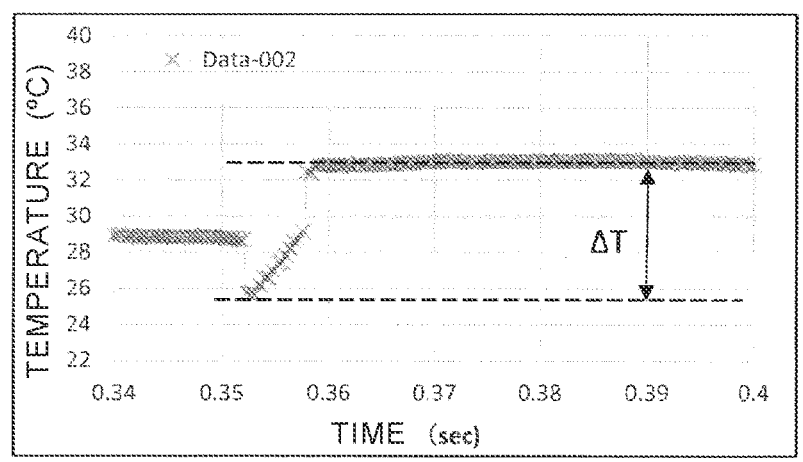
FIG. 8D is a graph showing a temperature change at a specific location in a portion around a front side between the front and rear wheels of the car of the electric train.
Figure 8E:
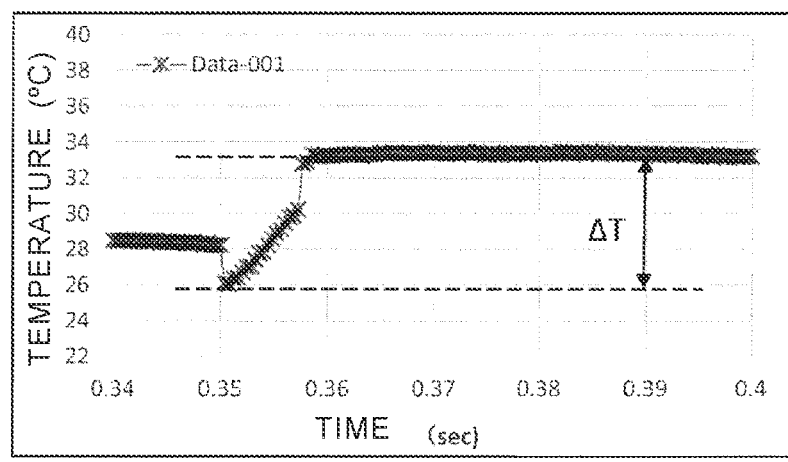
FIG. 8E is a graph showing a temperature change in a specific location in a portion around the front wheel of the car of the electric train.

FIGS. 3A to 3C are a diagram illustrating a frame of a portion around a rear wheel of the car of the electric train, a graph showing a temperature change at the specific location, and a stress distribution based on a temperature difference in a predetermined time range. FIGS. 4A to 4C are a diagram illustrating a frame of a portion around a rear side between front and rear wheels of the car of the electric train, a graph showing a temperature change at the specific location, and a stress distribution based on a temperature difference in a predetermined time range. FIGS. 5A to 5C are a diagram illustrating a frame of a portion around a central side between front and rear wheels of the car of the electric train, a graph showing a temperature change at the specific location, and a stress distribution based on a temperature difference in a predetermined time range. FIGS. 6A to 6C are a diagram illustrating a frame of a portion around a front side between the front and rear wheels of the car of the electric train, a graph showing a temperature change at the specific location, and a stress distribution based on a temperature difference in a predetermined time range. FIGS. 7A to 7C are a diagram illustrating a frame of a portion around the front wheel of the car of the electric train, a graph showing a temperature change at the specific location, and a stress distribution based on a temperature difference in a predetermined time range.

(a) First, one infrared image 12a is divided into the plurality of rectangular frames 14a to 14e in the direction perpendicular to the direction of the relative movement (FIGS. 3A, 4A, 5A, 6A, and 7A). The frames may be cut out manually or may be defined in advance in the program. Furthermore, a frame having the number of pixels from which the feature amount can be extracted may be cut out by a program. In this example, one infrared image 12a is divided into a total of five frames including two frames (14a and 14e) including wheels on both sides included in one car and three frames (14b to 14d) cut out by dividing a portion between the wheels.

(b) Next, the respective portions of the electric train, such as the feature portions of the car 2 and the wheel 4 are aligned on the frames 14a to 14e by pattern matching in the plurality of infrared images 12a to 12c. As a result, frames common to the frame 14a of the infrared image 12a are specified over the corresponding time interval in the other infrared images 12b and 12c. Similarly, frames common to the frames 14b to 14e are specified over time intervals.

(c) Next, a continuous time interval including the frame 14a common on the plurality of infrared images 12a to 12c is specified. This corresponds to the time interval during which the frame 14a is in the field of view of the infrared camera. Similarly, continuous time intervals including the common frames 14b to 14e in the plurality of infrared images 12a to 12c are specified.

(d) Further, a stress distribution 16a (FIG. 3C) of the portion is obtained for the frame 14a based on the temperature change ΔT (FIGS. 3B and 8A) of the portion calculated as the difference between the common frames over the continuous time interval. Similarly, the stress distributions 16b to 16e (FIGS. 4C, 5C, 6C, and 7C) of portions of the object are obtained for the frames 14b to 14e based on the temperature changes ΔT (FIGS. 4B, 5B, 6B, 7B, and 8B to 8E) of each of the portions calculated as the differences between the common frames over the continuous time interval.

(e) Further, a stress distribution image 18 is obtained (FIG. 11). The image is obtained by combining the stress distributions 16a to 16e corresponding to the plurality of rectangular frames 14a to 14e divided in the direction perpendicular to the direction of the relative movement.

Note that in the stress analysis device, the stress distribution is obtained based on the difference between the frames obtained by dividing the infrared image. However, the plurality of infrared images may be compared as it is without obtaining the difference. Since each infrared image indicates temperature information, the presence of a heating element in addition to an engine, a heater, steam, and the like can be detected by comparing the plurality of infrared images.

Note that the present disclosure includes appropriate combination of any embodiments and/or examples among various embodiments and/or examples described above, and can produce effects of the respective embodiments and/or examples.

The stress analysis device according to the present invention can measure a stress distribution of a moving body such as a running electric train, and thus is useful as an inspection device for the electric train or the like.

EXPLANATIONS OF LETTERS OR NUMERALS

1 ELECTRIC TRAIN (MOVING BODY)
2 CAR
4 WHEEL
6 VIEW
10 STRESS ANALYSIS DEVICE
12a, 12b, 12c INFRARED IMAGE
14a, 14b, 14c, 14d, 14e RECTANGULAR FRAMES
20 INFRARED CAMERA
30 IMAGE PROCESSING UNIT (COMPUTER DEVICE)
31 PROCESSING UNIT
32 STORAGE UNIT
33 DISPLAY UNIT
35 PROGRAM
35a ALIGNMENT UNIT
35b STRESS DISTRIBUTION CALCULATION UNIT

What is claimed is:

1. A stress analysis device for a moving body, comprising:
an image processing unit that performs image processing on a plurality of nfrared images of the moving body captured by an infrared camera while making a relative movement with respect to the moving body, wherein:
the image processing unit includes:
an alignment unit that aligns portions of an object included in the moving body in the plurality of the infrared images including the object, and
a stress distribution calculation unit that calculates temperature changes of each of the portions of the object to obtain stress distributions of the portions of the object based on the temperature changes,
the alignment unit divides one infrared image into a plurality of frames,
the alignment unit aligns the portions of the object on the plurality of frames in the plurality of the infrared images, and
the alignment unit specifies frames common to the plurality of frames in the plurality of the infrared images.

2. The stress analysis device according to claim 1, wherein the stress distribution calculation unit obtains stress distributions of the portions of the object based on the temperature changes in each of the portions of the object calculated as differences between the plurality of frames over a continuous time interval including the frames common in the plurality of the infrared images.

3. The stress analysis device according to claim 2, wherein the stress distribution calculation unit obtains stress distributions based on temperature differences between a highest temperature and a lowest temperature of each portion of the portions in the plurality of frames over the continuous time interval.

4. The stress analysis device according to claim 2, wherein:
each of the plurality of frames has a rectangular shape, and
the stress distribution calculation unit obtains a stress distribution image obtained by combining the stress distributions corresponding to the plurality of frames divided in a direction perpendicular to the direction of the relative movement.

5. The stress analysis device according to claim 1, further comprising:
an infrared camera that captures the plurality of infrared images of the moving body.

6. The stress analysis device according to claim 5, wherein the infrared camera is fixed.

7. The stress analysis device according to claim 1, wherein each of the plurality of frames has a rectangular shape.

8. The stress analysis device according to claim 1, wherein the alignment unit
divides the one infrared image into the plurality of frames in a direction perpendicular to a direction of the relative movement, and
aligns the portions on the plurality of frames based on preset feature portions of the portions of the object included in the moving body.

9. The stress analysis device according to claim 8, wherein the alignment unit aligns the portions on the plurality of frames through pattern matching of the preset feature portions of the portions of the object included in the moving body.

10. A stress analysis device for moving body, comprising:
an infrared camera that captures an infrared image of a moving body while making a relative movement with respect to the moving body; and
an image processing unit that performs image processing on a plurality of the infrared images captured by the infrared camera, wherein:
the image processing unit includes:
an alignment unit that aligns portions of an object included in the moving body in the plurality of the infrared images including the object, and
a stress distribution calculation unit that calculates temperature changes of each of the portions of the object to obtain stress distributions of the portions of the object based on the temperature changes, the alignment unit:
divides one infrared image into a plurality of frames each having a rectangular shape in a direction perpendicular to a direction of the relative movement,
aligns the portions on the plurality of frames in the plurality of the infrared images through pattern matching of preset feature portions of the portions of the object included in the moving body, and
specifies frames common to the plurality of frames in the plurality of the infrared images.

11. The stress analysis device according to claim 10, wherein the stress distribution calculation unit obtains stress distributions of the portions of the object based on the temperature changes in each of the portions calculated as differences between the plurality of frames over a continuous time interval including the frames common in the plurality of the infrared images.

12. The stress analysis device according to claim 11, wherein the stress distribution calculation unit obtains stress distributions based on temperature differences between a highest temperature and a lowest temperature of each portion of the portions in the plurality of frames over the continuous time interval.

13. The stress analysis device according to claim 11, wherein the stress distribution calculation unit obtains a stress distribution image obtained by combining the stress distributions corresponding to the plurality of rectangular frames divided in the direction perpendicular to the direction of the relative movement.

14. The stress analysis device according to claim 10, wherein the infrared camera is fixed.

* * * * *